United States Patent [19]

Chernoch

[11] 4,233,567
[45] Nov. 11, 1980

[54] FACE-COOLED LASER DEVICE HAVING INCREASED ENERGY STORAGE AND OUTPUT

[75] Inventor: Joseph P. Chernoch, Schenectady, N.Y.

[73] Assignee: General Electric Company, Schenectady, N.Y.

[21] Appl. No.: 969,045

[22] Filed: Dec. 13, 1978

Related U.S. Application Data

[63] Continuation-in-part of Ser. No. 818,725, Jul. 25, 1977, abandoned.

[51] Int. Cl.² .............................................. H01S 3/045
[52] U.S. Cl. .......................... 331/94.5 P; 331/94.5 D; 331/94.5 T
[58] Field of Search .................... 331/94.5 C, 940.5 D, 331/94.5 P, 940.5 T

[56] References Cited

U.S. PATENT DOCUMENTS

| | | | |
|---|---|---|---|
| 3,652,954 | 3/1972 | Snitzer | 331/94.5 P |
| 3,766,493 | 10/1973 | Nicolai | 331/94.5 D |

Primary Examiner—William L. Sikes
Attorney, Agent, or Firm—Nathan D. Herkamp; James C. Davis, Jr.; Paul R. Webb, II

[57] ABSTRACT

A solid laser rod optically pumped is cooled to produce a large thermal gradient extending only along the radiation propagation direction. This thermal gradient results in a reduced average gain cross section, permitting increased energy storage and correspondingly increased laser energy output without thermal optic distortion. In Nd:YAG lasers, a longitudinal cooling profile allows super-radiance at the high gain 1.06 μm transition to be suppressed and useful laser operation to be obtained on lower gain transitions, notably at 0.94 μm or 1.32 μm may be obtained.

27 Claims, 5 Drawing Figures

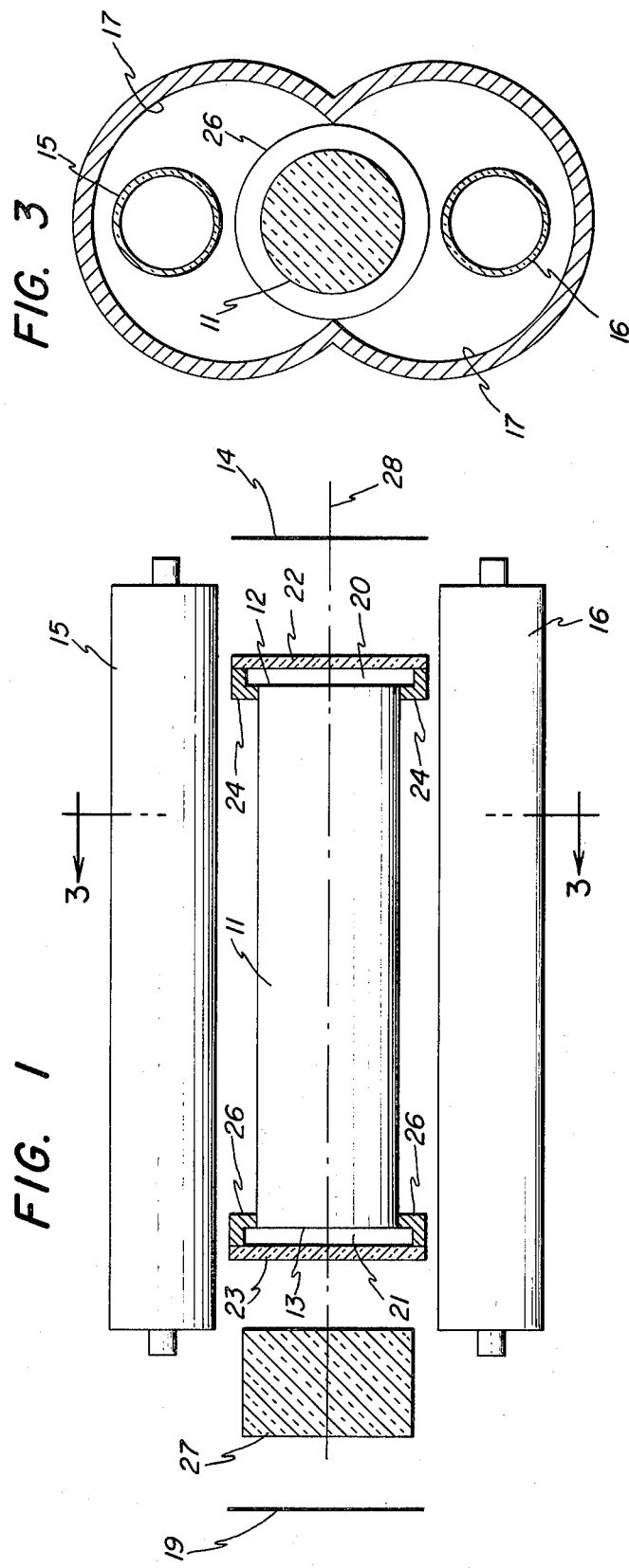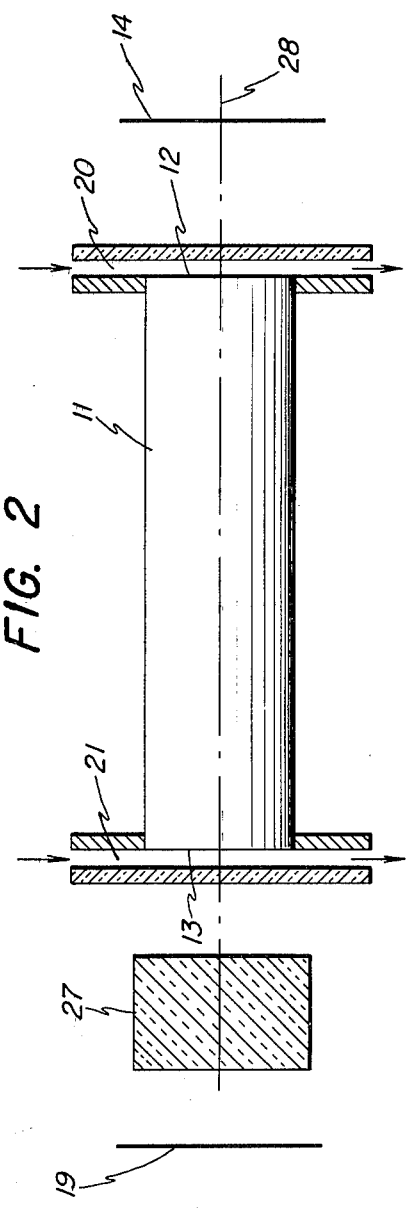

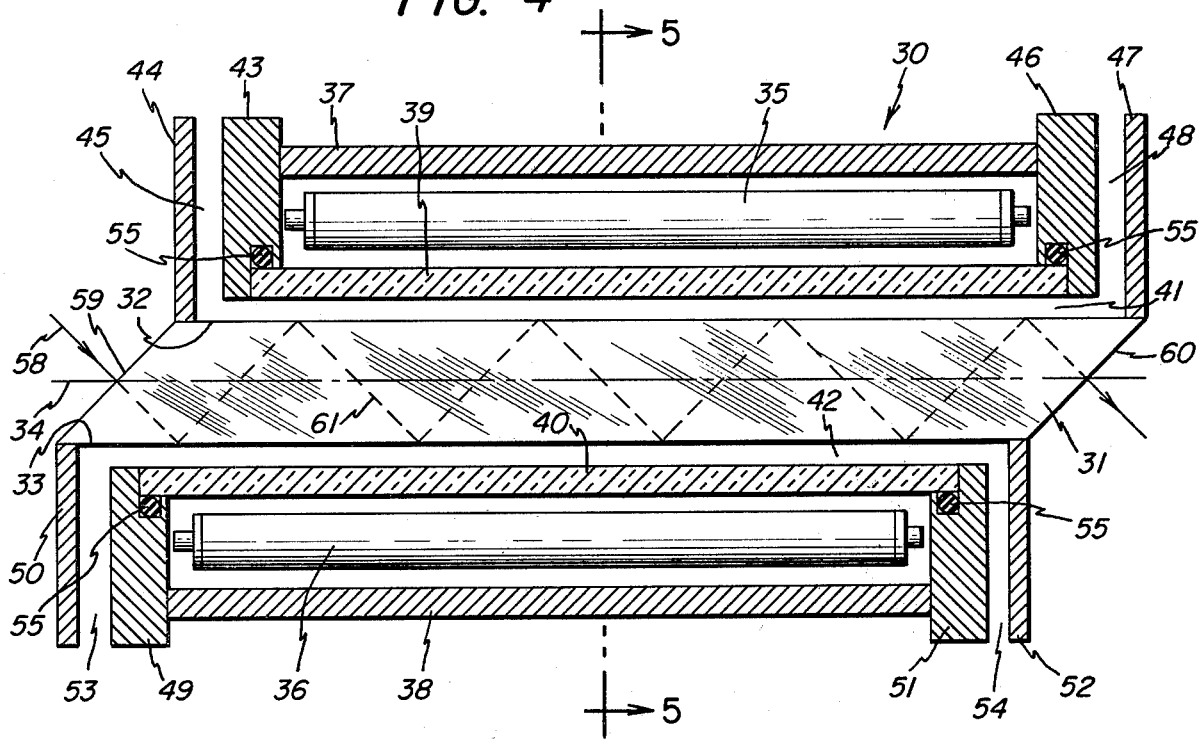
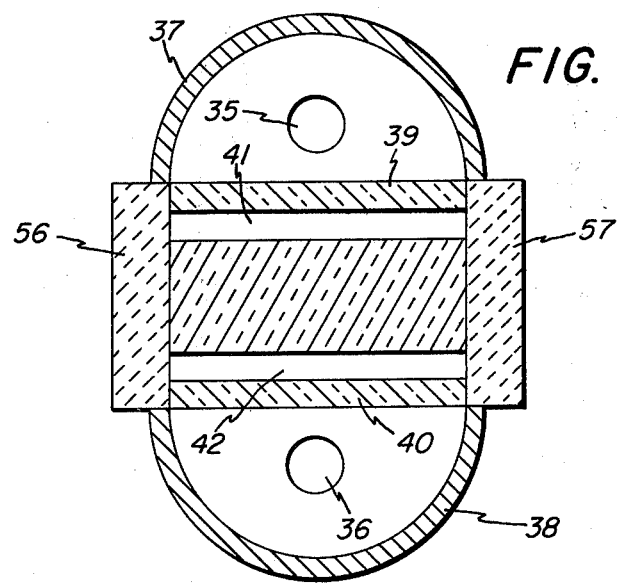

FACE-COOLED LASER DEVICE HAVING INCREASED ENERGY STORAGE AND OUTPUT

INTRODUCTION

This application is a continuation-in-part of application Ser. No. 818,725, filed July 25, 1977, now abandoned.

This invention relates to solid gain medium lasers, and more particularly to a method and apparatus for increasing energy storage and output of Q-switched rod laser oscillators and amplifiers, and for obtaining useful laser operation on lower gain transitions.

Present Q-switched laser oscillators and amplifiers, especially those comprised of neodymium-doped yttrium-aluminum-garnet (hereinafter Nd:YAG) are limited in their power output by a dissipation or dumping of the pumped inversion through amplified spontaneous emission. This limit in Nd:YAG is established by the high gain cross section of the 1.06 micrometer transition. A reduction in this gain cross section would result in a proportional increase in the maximum energy storage and resultant laser energy output.

The gain cross section of a laser is inversely related to the linewidth of the laser transition. Therefore, any process which increases the effective linewidth would reduce the overall gain. The optical gain or amplification in a pumped laser material is restricted to the frequency or wavelength region located within the linewidth of the transition, the gain being maximum at the center frequency of the line and, by definition, one half maximum at frequencies spaced at one half the linewidth apart on either side of the center frequency. The amplitude of the spontaneous emission exhibits the same frequency dependence. The linewidth of the 1.0641 micrometer (or $\mu$m) transition in Nd:YAG is 5 cm$^{-1}$ at room temperature and the frequency of the transition is temperature dependent where $d\nu/dt = -4.9 \times 10^{-2}$ cm$^{-1}$/°C. If a temperature gradient exists through the material, radiation spontaneously emitted by neodymium ions located in the material at one temperature would be "detuned" from the gain cross section of ions located in another region of the material at a different temperature, and thereby suffer less amplification. "Detuning" as used herein indicates that the frequency of maximum gain in one region of the material is shifted so as not to coincide with the frequency of maximum gain in another region of the material.

Prior art devices have cooled the active medium to minimize the effect of any temperature gradient. For example, in U.S. Pat. No. 3,631,362, issued Dec. 28, 1971 to Almasi et al. and U.S. Pat. No. 3,633,126, issued Jan. 4, 1972 to Martin et al., both assigned to the instant assignee, the active medium is cooled.

The present invention concerns achieving an increase in the output of a Q-switched laser oscillator or amplifier by operating the laser active medium in a manner to produce a large thermal gradient down the length of the medium. This effectively reduces the average gain cross section of the material and, in the case of a high gain laser material such as Nd:YAG, permits an increase in the energy storage capability of the material with a corresponding increase in laser energy output capability.

Although Nd:YAG is a relatively high gain laser material at the 1.06 $\mu$m transition, it is difficult to achieve efficient laser action on other transitions arising from the same upper level (or inverted population level) since spontaneous emission from that level of 1.06 $\mu$m will be amplified and prevent buildup of a large inversion (i.e., stored energy). One of the transitions from this upper level would result in lasing at 0.94 $\mu$m. As Nd:YAG is presently used, superfluorescence at 1.06 $\mu$m prevents attaining appreciable energy output at 0.94 $\mu$m, particularly since operation at 0.94 $\mu$m is improved if the material be operated at reduced temperature (e.g., $-100°$ C.) which serves to decrease the 1.06 $\mu$m linewidth, increasing its gain and thus further limiting the inversion that can be obtained.

Linewidth and center wavelength of Nd:YAG laser transitions at 1.06 $\mu$m and 0.94 $\mu$m differ in such a way that if a longitudinal temperature gradient is established in the laser rod, gain at 1.06 $\mu$m is reduced more than gain at 0.94 $\mu$m. By thus suppressing the 1.06 $\mu$m superfluorescence, it becomes possible to achieve greater storage of energy than heretofore deemed practical. This stored energy is available for extraction by stimulated emission in a suitable cavity for the lower gain 0.94 $\mu$m line or for any other transition originating from the storage level, such as 1.06 $\mu$m, 1.32 $\mu$m, etc., and is the same for each transition since only the transition thermal states differ.

Accordingly, one object is to provide a Q-switched laser having increased energy storage and output capability.

Another object is to provide a method and apparatus for reducing the average gain cross section of a laser.

Another object is to provide a method and apparatus for cooling a laser without introducing thermal optic distortion in radiation propagating through the laser.

Another object is to provide a method and apparatus for operating a Nd:YAG laser at 0.94 $\mu$m with high energy storage.

SUMMARY OF THE INVENTION

Briefly, in accordance with a preferred embodiment of the invention, a face-cooled solid rod laser comprises a rod of optically active laser material adapted, when irradiated with optical pumping radiation, to emit coherent radiation at a predetermined optical wavelength. The rod has opposite end faces that are substantially parallel. The end faces may be perpendicular to the longitudinal axis of the rod or they may be at Brewster's angle. Optical pumping means are situated alongside at least a portion of the longitudinal surface of the rod. Means are provided for maintaining the end faces of the rod at a predetermined temperature differential with respect to the center of the rod so as to establish a thermal gradient parallel to the longitudinal axis of the rod.

In accordance with another preferred embodiment of the invention, a method of increasing energy output of a rod laser having opposite end faces that are substantially parallel to each other and perpendicular to the longitudinal axis of the rod laser or at Brewster's angle so as to permit passage of radiation along the longitudinal axis of the rod laser comprises irradiating the rod of the laser with pumping radiation through the longitudinal surfaces of the rod, and maintaining a predetermined temperature differential along the length of the rod parallel to the longitudinal axis of the rod.

In a laser of the total internal reflection face pumped laser type, the reflecting surfaces are maintained at a predetermined thermal difference to produce a thermal gradient generally along the direction of propagation of the laser beam.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a side elevational view of apparatus employing the instant invention;

FIG. 2 is a top plan view of the laser rod employed in the apparatus of FIG. 1, together with cooling means therefor and a Q-switching device;

FIG. 3 is a section view of the apparatus shown in FIG. 1, taken along line 3—3, contained within a cavity reflector;

FIG. 4 is a side elevational view partly in section of a total internal reflection face pumped laser employing the instant invention; and FIG. 5 is a cross sectional view taken along line 5—5 of FIG. 4.

DESCRIPTION OF TYPICAL EMBODIMENTS

As shown in FIG. 1, a laser functioning as an oscillator is comprised of an optically active rod 11 having a pair of opposed, substantially parallel faces 12 and 13. Pumping means for the laser are shown as a pair of xenon discharge flash lamps 15 and 16, juxtaposed substantially parallel to laser body 11. Face 12 of laser body 11 is coated with a plurality of dielectric films which provide a substantially completely reflecting surface to the wavelength of the desired mode of oscillation. Alternatively, a separate mirror may be used, and face 12 may be uncoated or low-reflection coated. Face 13 of laser body 11 is uncoated or coated with a suitable low reflectance film to minimize reflections, as is well known in the art.

The laser comprises a standard laser cavity in which flash lamps 15 and 16 are included. A cavity reflector 17, shown in FIG. 3, is employed to divert light output from lamps 15 and 16 into the laser rod. Although laser rod 11 is illustrated in FIG. 3 as being circular in cross section, it may be rectangular or of other cross section.

As shown in FIGS. 1 and 3, laser rod 11, which conveniently may comprise Nd:YAG, is optically pumped only through its sides and, as shown in FIGS. 1 and 2, is cooled only at its end faces by passage of cooling fluid through conduits 20 and 21. Conduits 20 and 21 are formed by end faces 12 and 13, respectively, and clear, nondistorting lenses or windows 22 and 23, respectively. Windows 22 and 23 may be conveniently attached to the laser by flanges 24 and 26, respectively, and are constructed of fused silica or any material which is optically transparent to the coherent radiation emitted by laser rod 11. For a Nd:YAG laser, the outside major surfaces of windows 22 and 23 are made optically flat to within one tenth of a wavelength for the wavelength of coherent light emitted at the laser transition employed for the Nd:YAG laser. The direction of propagation of laser energy in rod 11 is parallel to longitudinal axis 28 of the rod, so that the configuration of the invention may be described as a face-cooled laser. A partially transmissive mirror 19 outside of window 23, along with a totally reflective mirror 14 at the opposite end of rod 11, completes a resonant Fabry-Perot cavity for the laser, in conventional fashion. The coolant fluid, which must be transparent at the laser wavelength, may comprise a liquid, such as water or a liquid fluorocarbon, or a gas, such as air or helium, flowing in the direction indicated by the arrows illustrated in FIG. 2.

The laser is typically employed with a conventional optical shutter 27 known as a Q-switch contained within the resonant cavity defined by substantially parallel reflecting surfaces 12 and 19. Shutter 27 functions by rotating the plane of polarization of optical energy passing therethrough by 90° when an electrical field is impressed across the shutter, as is well-known in the art. Functioning of a Q-switching cell exhibiting the Pockels effect is described in greater detail in Y.S. Liu application Ser. No. 668,605, filed Mar. 19, 1976 and assigned to the instant assignee.

During operation of solid laser rods at high repetition rates, considerable heat is generated within the laser body in response to optical pumping thereof. This necessitates removal of heat from the laser body. Surface cooling of the laser body along its longitudinal surface area produces a thermal gradient between the cooled outer surface and the relatively hot center region of the laser body. As a result, the center region of the laser body undergoes compression and the relatively cool surface of the laser body undergoes tension. Since the index of refraction is a function of both temperature and stress, the wavefront of a coherent light beam passing axially through the laser body in a conventional rod laser becomes distorted. This distortion occurs because the center ray passing through the relatively hot, compressed rod center is delayed relative to rays passing proximate the cool rod exterior. Distortion of the wavefront substantially reduces the efficiency of rod laser operation and also tends to produce a positive lens effect which focuses the beam along the length of the laser body and ultimately leads to self-destruction of the laser body. Cooling of only the ends of the rod laser, however, insures that the thermal gradient introduced into the laser body is aligned parallel to the direction of propagation of the laser radiation, which occurs parallel to longitudinal axis 28 of the laser. In this fashion, thermal optic distortion in the laser radiation propagating through the laser material is avoided. Existence of the temperature gradient through the material essentially "detunes" radiation spontaneously emitted by neodymium ions in the material of laser rod 11 at one temperature from the gain cross section of neodymium ions in another region of the material of laser rod 11 at a different temperature. In this fashion, the spontaneous radiation emitted by the neodymium ions undergoes less amplification.

Relevant properties for Nd:YAG lasers operating at wavelengths of 0.94 μm and 1.06 μm are as indicated below and as set forth by T. Kushida, "Linewidths and Thermal Shifts of Spectral Lines in Neodymium-Doped Yttrium Aluminum Garnet and Calcium Fluorophosphate", *Physical Review*, 185, September, 1969:

|  | 0.94μm line | 1.06μm line |
| --- | --- | --- |
| laser linewidth | 9cm$^{-1}$ | 5cm$^{-1}$ |
| line shift $d\nu/dt$ | $1.25 \times 10^{-2}$cm$^{-1}$/°C. | $-4.9 \times 10^{-2}$cm$^{-1}$/°C. |

Hence if one end of the laser rod, for example, is maintained at 100° C. and the other end of the rod maintained at 0° C., the shift of the 1.06 μm line is 4.9 cm$^{-1}$, which is substantially equal to 100% of its linewidth of 5 cm$^{-1}$. This doubles the average linewidth along the gain path, reducing the 1.06 μm amplification by one half. However, at 0.94 μm the line shift is only 1.25 cm$^{-1}$, increasing the average linewidth from 9 cm$^{-1}$ to 10.25 cm$^{-1}$ and thus reducing the 0.94 μm amplification by only 12%. These illustrative numbers assume the linewidth is not temperature dependent whereas in fact the reduction in linewidth with lowered temperature will accentuate the "detuning" effect of a temperature difference.

Similarly, output transition may be enhanced by cooling at least one end of the rod below ambient temperature. It is known to be advantageous to operate a Nd:YAG laser at below ambient temperature for the 0.94 transition. If one end of a Nd:YAG rod is maintained at approximately 0° C. and the other end at −100° C., the output is enhanced. For such a temperature range a liquid with an adequately low freezing point, such as fluorinated oil of the type sold under the trademark Krytox by E. I. duPont de Nemours and Company, or water mixed with ethylene glycol, alcohol or other low temperature tolerant liquid which is non-absorbing at the laser wavelength. Alternatively, gaseous coolant can be used for the low temperature operation of my invention.

In order to maintain a thermal gradient along the length of laser rod 11, rod end faces 12 and 13 are maintained at unequal temperatures, preferably at 100° C.–300° C. differential. This can be accomplished in any of several ways. For example, coolant in conduit 20 can be introduced at a temperature different from that of coolant in conduit 21. Alternatively, operating the laser at some repetition rate causes the crystal to be heated by the action of the laser. If the laser is cooled by extracting heat only through the end faces of the crystal, a temperature gradient is generated down the length of the crystal such that the ends of the crystal are cooler than the center. As yet another alternative, it is possible to cool only one end of the crystal, leaving the other end hot. The higher the temperature differential the greater the "detuning" and consequently the higher the energy stored in the gain medium.

In any event, the large thermal gradient produced along the length of the laser rod in the direction of propagating of optical radiation within the rod effectively reduces the average gain cross section of the material and, where rod 11 is fabricated of high gain laser material such as Nd:YAG, permits an increase in the energy storage of the material with a corresponding increase in laser energy output. Moreover, by cooling only end faces 12 and 13 of the laser, the thermal gradient is aligned parallel to the direction of propagation of the laser radiation and introduction of thermal optic distortion in the laser radiation propagating through the laser material is thereby avoided.

The thermal gradient may be enhanced by insulating the longitudinal surfaces. In the simplest case as shown in FIG. 1, the air adjacent rod 11 is stagnant between flanges 24 and 26 which serves to insulate the sides, thereby preventing any distortion of the gradient. The insulating of the longitudinal surface of rod 11 could be further enhanced by enclosing the space adjacent rod 11 between flanges 24 and 26 and filling the space with an insulating medium, or evacuating the space to form a vacuum enclosure surrounding rod 11. In this way, the uniformity of the gradient along the rod is enhanced. Alternatively, other means such as translucent glass wool or fused silica wool could be used to insulate rod 11.

In the embodiment shown in FIGS. 4 and 5, a total internal reflection face pumped laser 30 (TIR-FPL) is shown such as is described in U.S. Pat. No. 3,633,126, issued to Martin et al. on Jan. 4, 1972 assigned to the instant assignee and incorporated herein by reference.

The laser 30 generally includes an elongated homogeneous body 31 of laser active medium, e.g., neodymium doped YAG, having two optically plane faces 32, 33 extending parallel to the longitudinal axis 34 of laser body 31. Faces 32 and 33 are optically pumped by flash lamps 35, 36, respectively, e.g., xenon flash lamps, within reflectors 37, 38, respectively, or other suitable means.

Located between faces 32, 33 of laser body 31 and flash lamps 35, 36, respectively, are two optically transparent members 39, 40, respectively, which define cooling channels 41, 42, respectively, for establishing a temperature gradient across laser body 31 between faces 32 and 33. At one end of body 31 members 43, 44 define an inlet 45 to passage 41 and at the opposite end 46, 47 define outlet 48. Similarly, 49, 50 and 51, 52 define inlet 53 and outlet 54, respectively, of passage 42. Seals 55 may be used to ensure against leakage of coolant. As shown in FIG. 5, blocks 56, 57 define the edges of cooling passages 41, 42. Although the passages 41, 42 are described as running from one end of gain medium 31 to the other, the inlet and outlet could be so arranged that the coolant flow is transverse to faces 32, 33 of medium 31.

In operation of the embodiment of FIGS. 4 and 5, beam 58 enters the gain medium 31 at face 59 and is reflected from face 33 of body 31 toward face 32. After multiple reflections from each of faces 32 and 33 the beam passes out of body 31 through end face 60. Fluid is supplied to passages 41 and 42 from separate sources (not shown) such that a temperature difference of from 100° C.–300° C. is maintained between faces 32 and 33 of gain medium 31. Thereby, a temperature gradient is maintained in gain medium 31.

This temperature gradient causes the beam 58 to transverse regions of different temperature in passing through the material, increasing the average linewidth along the beam. If face 32 is the warmer of the two faces the beam is "detuned" each time it passes from face 33 to face 32. Thus the energy stored within gain medium 31 is greater than would be stored in a gain medium lacking the temperature gradient. When the beam is Q-switched as described above with respect to the first preferred embodiment, emission of the high energy stored within gain medium 31 is stimulated.

BEST MODE

The best mode contemplated incorporates the rod type gain medium illustrated in FIGS. 1–3 operated at 1.06 μm wavelength. The gain medium is Nd:YAG and the coolant is fluorinated oil of the type sold under the trademark Krytox. The sides of rod 11 are insulated by stagnant air, and the temperature difference between ends 12 and 13 is 300° C.

The foregoing describes a rod laser having increased energy storage and output capability. Although the invention has been described in terms of a laser oscillator, those skilled in the art will readily appreciate that the invention is equally applicable to laser amplifiers. The gain cross section of the rod laser is reduced by cooling the rod laser without introducing thermal optic distortion in radiation propagating through the laser. A Nd:YAG laser employing the invention is operable at 0.94 μm with high energy storage.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A face-cooled solid rod laser comprising:
   a pair of aligned mirrors defining an optical resonant cavity therebetween;
   a rod of optically active laser material disposed within said cavity and optically aligned with said mirrors and adapted, when irradiated with optical pumping radiation, to emit coherent radiation at a predetermined optical wavelength, said rod having a longitudinal axis and opposite end faces that are substantially parallel so as to permit passage of radiation along said axis;
   means for optically pumping said rod situated alongside at least a portion of the longitudinal surface of said rod; and
   means for maintaining said end faces at a predetermined temperature differential to establish a thermal gradient parallel to said longitudinal axis.

2. The apparatus of claim 1 wherein said means for maintaining said end faces at a predetermined temperature differential comprises conduit means adjacent at least one of said end faces, said conduit means containing a fluid coolant flowing therethrough.

3. The apparatus of claim 1 wherein said means for maintaining said end faces at a predetermined temperature differential comprises conduit means adjacent each of said end faces for conducting a separate flow of coolant fluid in contact with each of said faces, respectively.

4. The apparatus of claim 1 further including Q-switching means disposed within said cavity and optically aligned with said rod.

5. A method of increasing energy output of a rod laser having opposite end faces that are substantially parallel to each other so as to permit passage of radiation along the longitudinal axis of said rod, comprising:
   irradiating the rod of said laser with pumping radiation through the longitudinal surface of said rod to produce a beam of coherent electromagnetic radiation oscillating through said rod between mirrors aligned with said axis of said rod; and
   maintaining a predetermined temperature differential along the length of said rod parallel to said longitudinal axis.

6. The method of claim 5 wherein said temperature differential is in the range of 100°-300° C.

7. The method of claim 5 wherein the step of maintaining a predetermined temperature differential along the length of said rod comprises contacting one end face of said rod with coolant fluid at a predetermined temperature, and contacting the other end face of said rod with a fluid at a different temperature.

8. The method of claim 7 wherein the difference in temperature between said coolant fluid and the fluid contacting the other of said end faces is in the range of 100°-300° C.

9. The method of claim 5 wherein the step of maintaining a predetermined temperature differential along the length of said rod comprises cooling one end face of said rod.

10. The method of claim 8 wherein said one end face of said rod is contacted with coolant fluid at a temperature to maintain said one end face at a temperature of 100°-300° C. below that of the other of said end faces.

11. The method of claim 5 wherein said temperature differential is achieved by maintaining one end face of said rod substantially at 0° C. and the opposite end face of said rod substantially at 100° C.

12. The apparatus of claim 2 or 3 wherein said means for maintaining said end faces at a predetermined temperature further comprises insulation situated adjacent the longitudinal surface of said rod.

13. The apparatus of claim 2, 3 or 4 wherein said end faces are perpendicular to the longitudinal axis of said rod.

14. The apparatus of claim 2, 3 or 4 wherein said end faces are at Brewster's angle with respect to the longitudinal axis of said rod.

15. The method of claim 7 or 9 wherein said step of maintaining a predetermined temperature differential along the length of said rod further comprises insulating the longitudinal surface of said rod.

16. The method of claim 15 wherein the step of insulating the longitudinal surface of the rod comprises wrapping transparent, thermal insulation around the rod.

17. The method of claim 15 wherein the step of insulating the longitudinal surfaces of the rod comprises enclosing the longitudinal surfaces of said rod within a vacuum chamber.

18. The method of claim 5 further comprising Q-switching said radiation.

19. A total internal reflection face pumped laser comprising:
   an elongated homogeneous body of an active laser medium disposed within a laser cavity defined by two mirrors, said body having a longitudinal axis and at least two optically plane faces extending substantially parallel to each other and to said longitudinal axis;
   pumping means for impinging electromagnetic radiation upon at least one of said optically plane faces to excite atoms of said body to a metastable state thereby producing a population inversion therein;
   means for passing fluid coolant across at least one of said optically plane faces to maintain said faces at a predetermined temperature differential to produce a thermal gradient through said body from one of said faces to the other; and
   means for passing a beam of electromagnetic radiation through said pumped body in an off-axial direction at an angle of incidence relative to said optically plane faces of said body sufficient to produce a plurality of total internal reflections by each of said optically plane faces of said body, said mirrors being aligned generally perpendicular to said beam so that individual rays of said electromagnetic radiation pass through said body a plurality of times.

20. The device of claim 19 further comprising Q-switching means disposed within said cavity and optically aligned with radiation emitted from said body.

21. A method of increasing energy output of a total internal reflection face pumped laser having an elongated homogeneous body of an active laser medium, said body having a longitudinal axis and at least two optically plane faces extending substantially parallel to each other and to said longitudinal axis comprising:

irradiating the body with pumping radiation through said optically plane faces to produce a beam of coherent electromagnetic radiation oscillating between mirrors aligned with said beam such that said radiation is reflected through said body a plurality of times; said beam reflecting from each of said optically plane faces a plurality of times during each passage thereof through said body; and maintaining one of said optically plane faces at a first predetermined temperature such that the other of said optically plane faces is at a temperature substantially different from said predetermined temperature.

22. The method of claim 21 wherein said step of maintaining one of said optically plane faces at a first predetermined temperature comprises passing a coolant fluid over said one of said optically plane faces.

23. The method of claim 22 further comprising maintaining said other of said optically plane faces at a second predetermined temperature.

24. The method of claim 23 wherein said step of maintaining said one of said optically plane faces at said first predetermined temperature comprises passing a first flow of coolant over said one of said optically plane faces to maintain said one of said optically plane faces at said first predetermined temperature and said step of maintaining said other of said optically plane faces at said second predetermined temperature comprises passing a second separate flow of coolant over said other of said optically plane faces to maintain said other of said optically plane faces at said second predetermined temperature.

25. The method of claim 24 wherein said first predetermined temperature differs from said second predetermined temperature by 100° C.–300° C.

26. The method of claim 24 wherein said coolant is water.

27. The method of claim 24 wherein said coolant is liquid fluorocarbon.

* * * * *